(12) United States Patent
Simanovski et al.

(10) Patent No.: US 8,654,799 B2
(45) Date of Patent: Feb. 18, 2014

(54) SHORT-PULSE FIBER-LASER

(75) Inventors: Dmitri Simanovski, Palo Alto, CA (US);
Andrei Starodoumov, Cupertino, CA (US)

(73) Assignee: Coherent, Inc., Santa Clara, CA (US)

( * ) Notice: Subject to any disclaimer, the term of this patent is extended or adjusted under 35 U.S.C. 154(b) by 84 days.

(21) Appl. No.: 12/967,343

(22) Filed: Dec. 14, 2010

(65) Prior Publication Data

US 2012/0147908 A1 Jun. 14, 2012

(51) Int. Cl.
*H01S 3/067* (2006.01)
*H01S 3/1055* (2006.01)

(52) U.S. Cl.
USPC ................................ 372/6; 372/99; 372/102

(58) Field of Classification Search
USPC ................................ 372/6, 99, 102
See application file for complete search history.

(56) References Cited

U.S. PATENT DOCUMENTS

| | | | |
|---|---|---|---|
| 6,111,645 A * | 8/2000 | Tearney et al. | 356/499 |
| 6,603,600 B2 | 8/2003 | Pang | |
| 7,233,607 B2 | 6/2007 | Richardson et al. | |
| 7,542,192 B2 | 6/2009 | Resan et al. | |
| 7,688,493 B2 | 3/2010 | Resan et al. | |
| 2008/0175280 A1* | 7/2008 | Bouma et al. | 372/20 |
| 2009/0003391 A1 | 1/2009 | Li | |
| 2009/0086772 A1 | 4/2009 | Kasamatsu | |
| 2010/0296529 A1 | 11/2010 | Andersen et al. | |
| 2012/0133931 A1 | 5/2012 | Fermann et al. | |

FOREIGN PATENT DOCUMENTS

| | | |
|---|---|---|
| JP | 2004-55626 A | 2/2004 |
| JP | 2004-173054 A | 6/2004 |

OTHER PUBLICATIONS

Deng et al., "Self-starting passive harmonic mode-locked femtosecond Yb3+-doped fiber laser at 1030 nm", Optics Letters, vol. 29, No. 18, Sep. 15, 2004, pp. 2121-2123.
Lecaplain et al., "High-energy femtosecond pulses from a dissipative soliton fiber laser", Optics Letters, vol. 34, No. 23, Dec. 1, 2009, pp. 3731-3733.
Lecaplain et al., "High-power all-normal-dispersion femtosecond pulse generation from a Yb-doped large-mode-area microstructure fiber laser", Optics Letters, vol. 32, No. 18, Sep. 15, 2007, pp. 2738-2740.
Lim et al., "Environmentally-stable femtosecond ytterbium fiber laser with birefringent photonic bandgap fiber", Optics Express, vol. 13, No. 9, May 2, 2005, pp. 3460-3464.
Ortac et al., "Passively mode-locked single-polarization microstructure fiber laser", Optics Express, vol. 16, No. 3, Feb. 4, 2008, pp. 2122-2128.
Leitner et al., "Low-Temperature-GaAs Device Used Simultaneously as a Mode-Locking Device and as a Photoconductive Switch", Applied Optics, vol. 41, No. 12, Apr. 20, 2002, pp. 2228-2231.

(Continued)

*Primary Examiner* — Jessica Stultz
*Assistant Examiner* — Michael Carter
(74) *Attorney, Agent, or Firm* — Morrison & Foerster LLP

(57) ABSTRACT

A mode-locked fiber laser has a resonator including a gain-fiber, a mode-locking element, and a spectrally-selective dispersion compensating device. The resonator can be a standing-wave resonator or a traveling-wave resonator. The dispersion compensating device includes only one diffraction grating combined with a lens and a minor to provide a spatial spectral spread. The numerical aperture of the gain-fiber selects which portion of the spectral spread can oscillate in the resonator.

12 Claims, 10 Drawing Sheets

(56) References Cited

OTHER PUBLICATIONS

International Search Report and Written Opinion received for PCT Patent Application No. PCT/US2011/063572, mailed on Nov. 19, 2012, 14 pages.

Zaouter et al., "Transform-Limited 100 µJ, 340 MW Pulses from a Nonlinear-Fiber Chirped-Pulse Amplifier using a Mismatched Grating Stretcher-Compressor", Optics Letters, vol. 33, No. 13, Jul. 1, 2008, pp. 1527-1529.

* cited by examiner

SHORT-PULSE FIBER-LASER

TECHNICAL FIELD OF THE INVENTION

The present invention relates in general to fiber lasers. The invention relates in particular to mode-locked fiber lasers.

DISCUSSION OF BACKGROUND ART

Stable, low-noise sources of ultra short pulses are important for a wide range of applications including ultrafast spectroscopy, multi-photon excitation microscopy, micromachining, harmonic generation, and the pumping parametric amplifiers and oscillators. Such sources are usually referred to by practitioners of the art as ultrafast lasers. The most common ultrafast lasers are solid-state lasers having a crystal gain-medium, such as titanium-doped sapphire (Ti:sapphire), with a broad gain-bandwidth.

Fiber lasers offer an attractive alternative to solid-state ultrafast lasers. Such lasers provide an ability to operate in a wide range of pulse-repetition frequency, for example, between about 10 megahertz (MHz) and 400 MHz and can be contained in a compact package. Compared to solid-state crystal lasers, fiber lasers have high intra-cavity dispersion. This is because most of the resonator (cavity) optical path of the laser is in glass (the fiber) and not in air. It is well known that the less the intra-cavity dispersion, the shorter the pulses that can be obtained.

There are a few methods for reducing intra-cavity dispersion in fiber lasers. One uses chirped fiber Bragg gratings (CFBG). Another uses a compressor and stretcher arrangement based on bulk diffraction gratings. Yet another method uses a photonic-bandgap fiber or other specialty fiber with a specially designed dispersion-profile to compensate dispersion provided by a gain-fiber and intra-cavity components.

Chirped fiber Bragg gratings (CFBGs) are often used for generating picosecond pulses from an all-fiber cavity when fiber dispersion is not completely compensated. At low dispersion, however, for example less than 1 picosecond per nanometer (ps/nm), a CFBG typically has a low reflectivity (<40%). Such a low reflectivity makes it difficult to use such gratings in mode-locked fiber-lasers wherein reflectivity required for mode-locking is typically above 50%. Mode-locked fiber lasers are often used when pulses shorter than 1 picosecond (ps) are required.

A compressor arrangement based on diffraction gratings provides adjustable dispersion, which can be tuned to exactly compensate intra-cavity dispersion. An example 10 of such a compressor arrangement is depicted in FIG. 1. A compressor 10 includes essentially identical diffraction gratings 12A and 12B arranged spaced apart and parallel to each other in combination with a mirror 14 comprising a multilayer reflective coating 16 on a substrate 18.

Here, an input pulse $P_{In}$ has a spectral bandwidth $\lambda_3$ minus $\lambda_1$, and a center wavelength $\lambda_2$. It is assumed that, as a result of intra-cavity dispersion, shorter wavelengths such as $\lambda_1$ have been delayed more than longer wavelengths such as $\lambda_3$ thereby increasing the duration (length) of the pulse. Grating 12A diffracts the pulse wavelengths at different angles with longer wavelengths such as $\lambda_3$ diffracted at a greater angle than shorter wavelengths such as $\lambda_1$. Grating 12B directs the variously diffracted wavelengths along parallel paths to be incident mirror 14. Mirror 14 reflects the wavelengths back along their incident paths to recombine, on the path of the input pulse, as an output pulse $P_{out}$. As the paths of the longer wavelengths are longer than those of the shorter wavelengths, the shorter wavelengths "catch-up" with the longer wavelengths sufficiently that output pulse has a shorter duration that the input pulse.

With the mirror of a "grating pair" pulse-compressor such as compressor 10 used an end-mirror of a mode-locked fiber-laser pulses shorter than 1 ps have been obtained. Such a compressor however has certain drawbacks. One drawback is that control of the lasing wavelength in the laser cavity with a compressor is difficult as spectral selectivity of the compressor is very low. By way of example FIG. 2 schematically illustrates typical measured diffraction efficiency of a transmission grating such as gratings 12A and 12B. It can be seen that diffraction efficiency varies by only a few percent over a spectral (wavelength) range between about 1000 nm and 1080 nm. Accordingly, the prior art compressor of FIG. 1 could at best be described as weakly wavelength selective in this range, which represents about the full gain-range (emission range) of an ytterbium (Yb) doped gain-fiber.

FIG. 3 schematically illustrates a typical prior-art arrangement 20 a mode-locked fiber laser including a grating-pair compressor such as compressor 10 of FIG. 1. Laser 20 has a resonant cavity formed between mirror 14 of compressor 10 and a saturable Bragg reflector (SBR) 22, which provides passive mode-locking of the laser. The resonant cavity (resonator) includes an active (doped) fiber 26 and through-fibers 32 and 36 of couplers 28 and 30 spliced to the active fiber. SBR 22 is formed from a saturable absorber and a Bragg reflector. One surface of the SBR 22 is mounted to a substrate 26 and the opposed surface is butt-coupled to fiber 36. A lens 40 collimates radiation from the fiber portion of the resonator before the radiation enters compressor 10. Lens 40 focuses radiation from the compressor back into the fiber portion of the resonator. A half-wave plate 42 adjusts polarization of returning radiation to maximize transmission through the gratings 12B and 12A. Coupler 30 is a wavelength-division multiplexing (WDM) coupler coupling pump radiation into the fiber portion of the resonator via a fiber 38. Coupler 28 is a fractional coupler which couples a fraction of circulating radiation out of the resonator, as mode-locked output pulses, via a fiber 34.

FIG. 4 schematically illustrates the absorption (solid curve) and emission (dashed curve) spectra over a wavelength range from about 850 nm to 1150 nm. It can be seen that the emission-curve has a strong narrow peak centered at about 975 nm partially overlapping a peak in the absorption spectrum centered at a wavelength of about 980 nm which is the usually preferred pump-wavelength for a Yb-doped fiber. At longer wavelengths, the emission curve varies relatively strongly with a peak gain between about 1035 nm and about 1040 nm. Because of the relatively weak spectral selectivity of compressor 10, and in the absence of any other spectral selective device in the resonator, the gain-curve would dominate the wavelength selection process and the resonator (pumped by 980 nm radiation) would oscillate in the 1035 nm to 1040 nm peak-gain region.

Apart from the lack of spectral selectivity another drawback of the grating-pair compressor is that circulating radiation makes forward and reverse passes through each grating. Even given an efficiency of about 95%, as indicated in FIG. 2, the four passes would introduce resonator losses of about 20%. While active fiber 26 has high gain and the resonator can tolerate relatively high losses, such losses detract from overall efficiency of a fiber laser. Yet another drawback is the high cost of the diffraction gratings, which are by far the most expensive components in the laser cavity. Including two such gratings makes what would be a relatively inexpensive laser quite costly.

There is a need for an intra-cavity compressor arrangement which has sufficiently high spectral selectivity to determine a lasing wavelength within the gain-bandwidth of a gain-fiber but does not require two diffraction gratings. Such a compressor could enable the building of low-cost femtosecond laser systems with controllable lasing wavelength, which could expand the range of applications for such systems.

SUMMARY OF THE INVENTION

One aspect apparatus in accordance with the present invention comprises a laser resonator including a fiber gain-medium having a gain-bandwidth. A pump-radiation source is arranged to energize the gain-fiber for generating laser-radiation in the laser-resonator. A mode-locking element is located in the resonator for causing the laser-radiation to be generated as mode-locked pulses, the mode-locked pulses undergoing dispersion while propagating through the gain-fiber. A wavelength-selective dispersion compensating device is located in the laser-resonator for compensating the dispersion undergone by the mode-locked pulses and selecting a center wavelength of the mode-locked pulses within the gain-bandwidth of the gain-fiber.

In preferred embodiments of the inventive apparatus the wavelength selective dispersion compensating device includes first and second lenses having a transmission diffraction grating therebetween. Radiation exiting the gain fiber is collimated by the first lens diffracted into a spectrally graded fan of rays by the diffraction grating focused by the second lens onto a plane mirror which reflects the spectrally spread rays back through the first lens to the diffraction grating. The diffraction grating directs the spectrally spread rays back to the first lens which focuses the rays back into the fiber. Spectral-selection and dispersion-compensation can be selectively varied by selectively varying the spacing between the grating and the second lens. Because there is only one diffraction grating in the device, losses are significantly reduced compared with prior-art grating pair compensation devices which are essentially not spectrally selective.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 5:
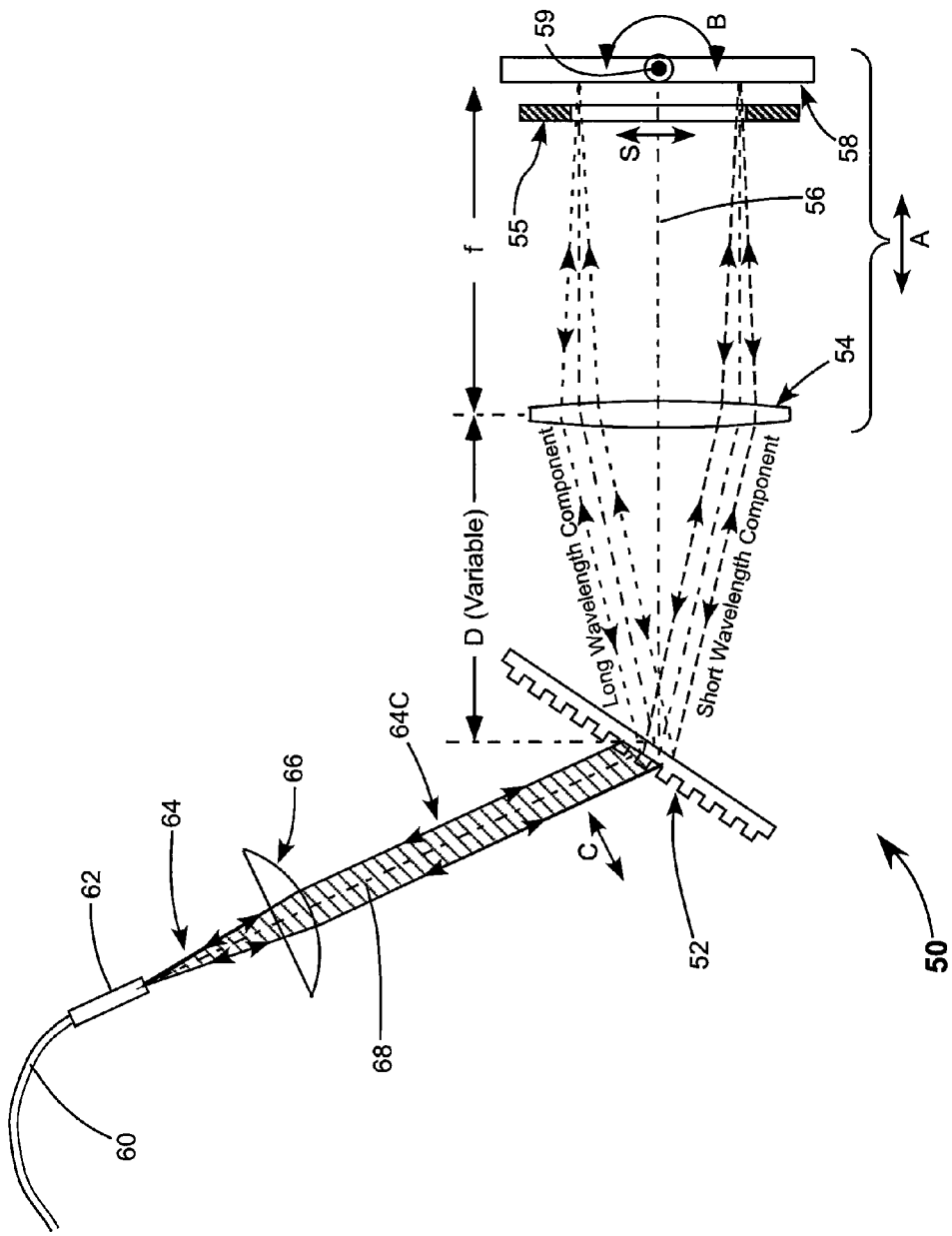
FIG. 5 schematically illustrates one preferred embodiment an intra-cavity dispersion compensating device in accordance with the present invention including a diffraction grating cooperative with a lens and a plane mirror, with the grating and mirror each axially spaced from the lens by a focal length thereof such that the device is in a neutral mode providing neither dispersion nor spectral selectivity.

Continuing with reference to the drawings, wherein like components are designated by like reference numerals, FIG. 5 schematically illustrates one preferred embodiment an intra-cavity dispersion compensating device 50 in accordance with the present invention. Device 50 includes a transmission diffraction grating 52, a positive lens 54 having an optical axis 56, and a plane mirror 58. Mirror 58 provides one-end mirror of a linear laser-resonator including a fiber gain-medium. A connecting fiber 60 for the gain-medium is terminated by a ferrule 62.

A radiation pulse initially exits fiber 60 (ferrule 62) as a diverging beam 64. Beam 64 has a numerical aperture (NA) which is determined by the NA and core diameter of fiber 60. Diverging beam 64 is collimated by a positive lens 66 having an optical axis 68. The collimated beam is designated 64C in FIG. 5 and is assumed here to have a cross-section centered on optical axis 68 of lens 66. Optical axis 68 intersects optical axis 56 of lens 54 at diffraction grating 52.

Forward propagating beam 64C has a spectral bandwidth corresponding to the spectral bandwidth of the pulse, with all spectral components equally distributed over the beam cross-section. At diffraction grating 52 the spectral components are spread into continuous fan of beams in the plane of incidence of beam 64C on the diffraction grating, i.e., in the plane of the drawing. In the drawing, only the longest and shortest wavelength beams are depicted for simplicity of illustration.

In this depiction, the point of incidence of beam 64C of grating 52 is axially spaced from lens 54 by a distance D equal to the focal length f of the lens and mirror 58 is spaced from the lens by that same focal length. All spectral component beams are focused on the mirror to form an elongated spectrum on the mirror. All components are reflected by mirror 58 back along their incidence paths, are combined by grating 52 into a return-propagating collimated beam 64C which is focused by lens 66 back into fiber 60.

Those skilled in the art may recognize the particular arrangement the grating, lens and mirror of FIG. 5 as similar to a Fourier "pulse-shaper" in which mirror 58 would be replaced by a pixilated, reflective, spatial light modulator (SLM), arranged to selectively attenuate or remove spectral components of a pulse. Indeed, such an arrangement could, in theory at least, provide the required selectivity for determining the operating wavelength of a laser. However, as an object of the present invention is to minimize cost of a laser spectral selectivity is achieved by other means.

As depicted particularly in FIG. 5, device 50 provides neither dispersion compensation nor spectral selectivity and would never be used in that precise configuration. Both dispersion compensation and spectral selectivity can be provided by one or more simple reconfigurations of the device. By way of example, the grouping of lens 54 and mirror 58, still spaced apart by focal length f, can be moved toward or away from grating 52, as indicated by arrows A to provide dispersion compensation together with some measure of spectral (primarily bandwidth) selectivity by changing the distance D. These components could be mounted on a translation stage to create a device with selectively variable dispersion. Alternatively the combination of grating 52, lens 54 and ferrule 62 could be moved, with lens 54 and mirror 58 fixed. If the grating is moved within a focal length of the lens the sign of the dispersion will be the opposite of the case when the grating is more than a focal length from the lens.

Center wavelength selectivity can be provided by tilting mirror 58 about an axis 59 perpendicular to axis 56 as indicated in FIG. 5 by arrows C. Lens 54 could be tilted in a similar manner to achieve center wavelength selectivity. Center wavelength selectivity could also be provided by changing the incidence point of forward-propagating collimated beam 64C on grating 52 in the incidence plane of the beam on the grating. Center wavelength selectivity could also be provided by locating an aperture plate 55 translatable perpendicular to axis 56, as indicated by arrows S in front of mirror 58. The width (height) of the aperture in the plate could be selected to restrict the bandwidth of the spectrum reflected back by the mirror.

Figure 6:
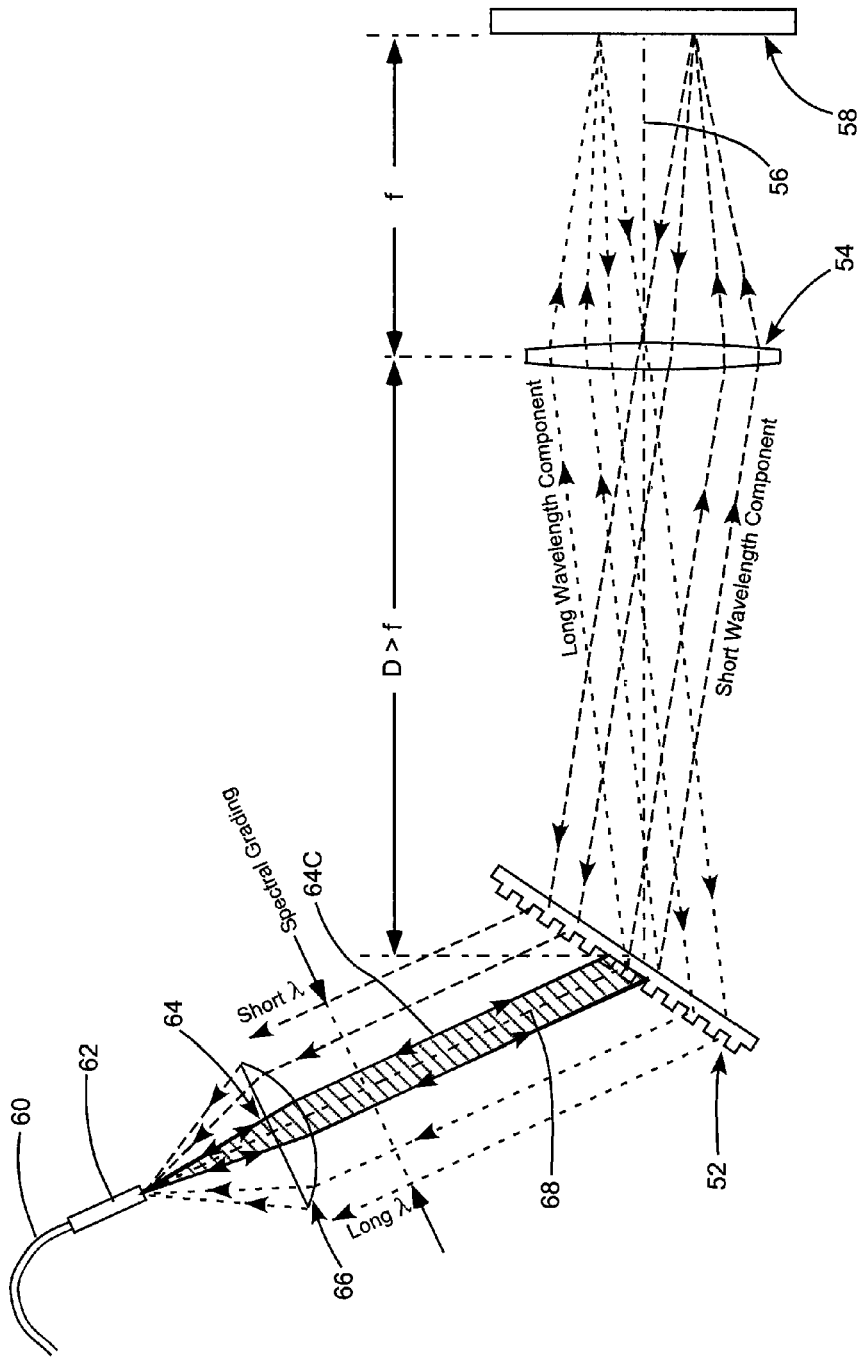
FIG. 6 schematically illustrates the device of FIG. 5 but with the grating spaced from the lens by more than a focal length thereof such that the device provides negative dispersion and functions as a pulse compressor and also functions in a spectrally-selective manner to limit the spectral bandwidth of a pulse.

FIG. 6 schematically illustrates one configuration 50A of device 50 which provides dispersion compensation and spectral bandwidth selectivity. Here the axial spacing D of grating 52 and lens 54 is greater than focal length f of lens 54. Rays spread by grating 54 do not return along their incidence paths and are not recombined by the grating. The longer wavelength components travel on a longer path through device 50 than the shorter wavelength components, providing the necessary dispersion compensation.

Because the spectral components do not return on their incident paths, a hypothetical (one time) return beam of all components that is wider in the plane of incidence (plane of the drawing) than the incident beam, and spectrally graded (spatially "chirped") across the beam width from the wavelength of the shortest wavelength component to the wavelength of the longest wavelength component. However, only those components of the spectral gradient that fall on (overlap) the beam-path of incident bean 64C (cross-hatched in FIG. 6) can be focused back into fiber 60. Other components either fall outside the aperture of lens or are focused by the lens outside of the NA of the fiber (cross-hatched beam 64) and cannot be guided by the fiber. So the bandwidth of radiation that could oscillate in a resonator terminated by the device is determined by the configuration of the device and the NA of the fiber (NA of output beam 64). In this example, that bandwidth has been significantly narrowed by the device.

It should be noted, here, that in FIG. 6 rays outside the NA of the gain-fiber are depicted only to illustrate how spectral selection is achieved in the inventive device and would only exist when radiation initially exited the fiber in a transient stage prior to lasing. In steady-state operation, there will be no radiation at wavelengths outside of that band of wavelengths that return from the diffraction grating to fall within the NA of the fiber. Accordingly, the wavelength selection mechanism itself does not create a loss. The only significant loss will result from the double pass though the grating at less than 100% efficiency per pass.

Those return-propagating components that do overlap the incident beam path will still be spectrally graded across the beam but will be homogenized by the return passage through the fiber. It should also be noted that in this configuration of the inventive device, the center wavelength of the narrowed bandwidth would be about the same as the center wavelength of the bandwidth in the absence of a wavelength selective device. However, the actual oscillating wavelength of a fiber laser including the device could differ depending on the location of the narrowed bandwidths on the gain-curve of the fiber.

Figure 6A:
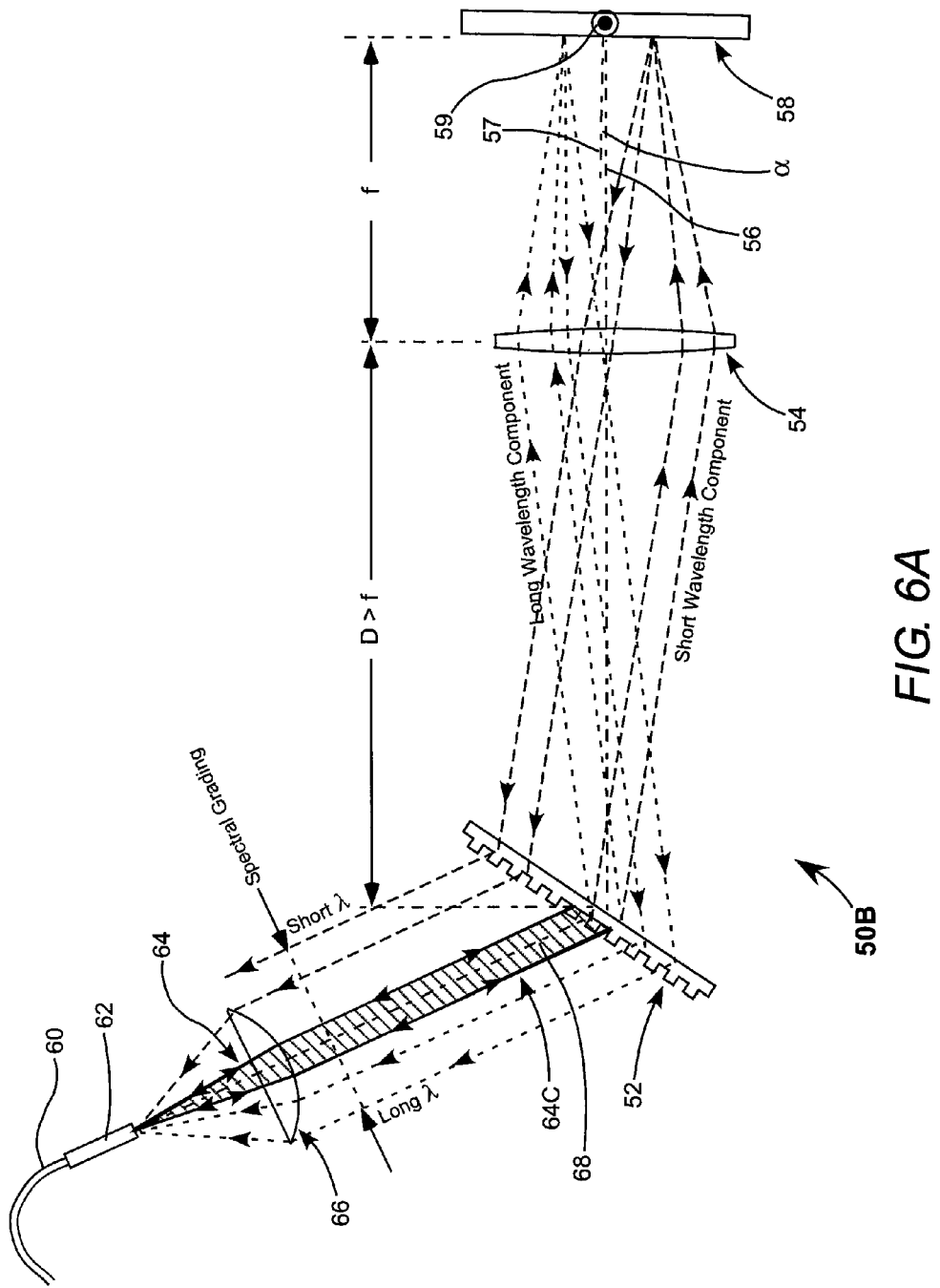
FIG. 6A schematically illustrates the device of FIG. 6 but with the mirror tilted with respect to the lens to select a particular wavelength of the pulse in addition to limiting the bandwidth of the pulse.

FIG. 6A schematically illustrates another configuration 50B of device 50 which provides dispersion compensation, spectral bandwidth selectivity, and center wavelength selectivity. Configuration 50B is similar to configuration 50A of FIG. 6 with an exception that the normal 57 to mirror 58 is inclined by a small angle a to axis 56 of lens 54. This causes the spectral grading in the return direction from the grating to be laterally displaced with respect to axis 68 of lens 66 such that wavelengths overlapping the path of the incident beam are from the long wavelength side of the spectrum. Tilting mirror 58 in the opposite direction would select wavelengths from the short wavelength side of the spectral gradient of the device. The selected bandwidth would be about the same whatever center wavelength was selected by the tilting.

Figure 1:
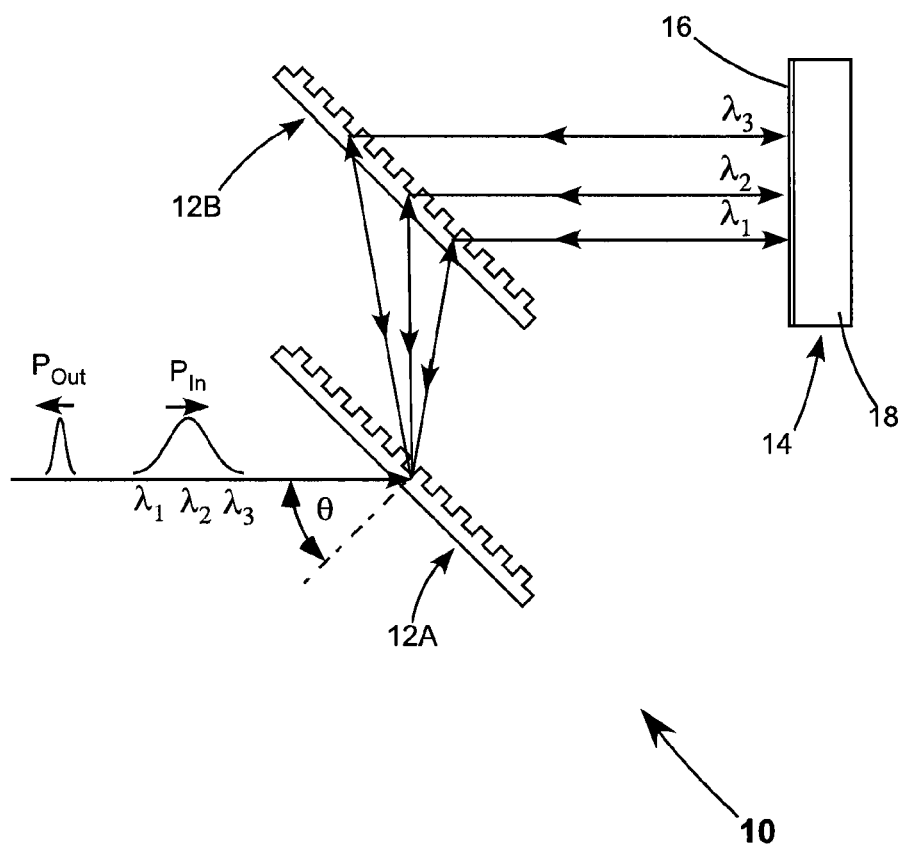
FIG. 1 schematically illustrates a prior-art pulse-compressor including first and second diffraction gratings spaced part and parallel to each other with the first grating arranged to spread a single incident beam into diverging spectral components, the second arranged to direct the spectral components parallel to each other to be incident of a mirror, with the mirror arranged to reflect the spectral components back along their incident path to be recombined by the first grating back along the path of the incident beam.
Figure 2:
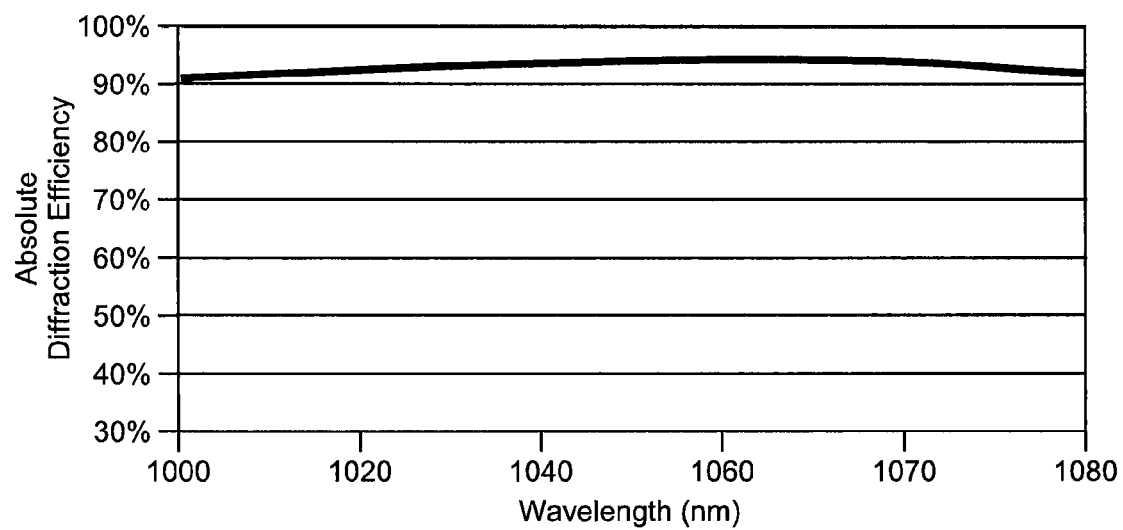
FIG. 2 is a graph schematically illustrating absolute diffraction efficiency as a function of wavelength for a commercially available diffraction grating as a function of wavelength in a range between 1000 and 1080 nanometers.
Figure 3:
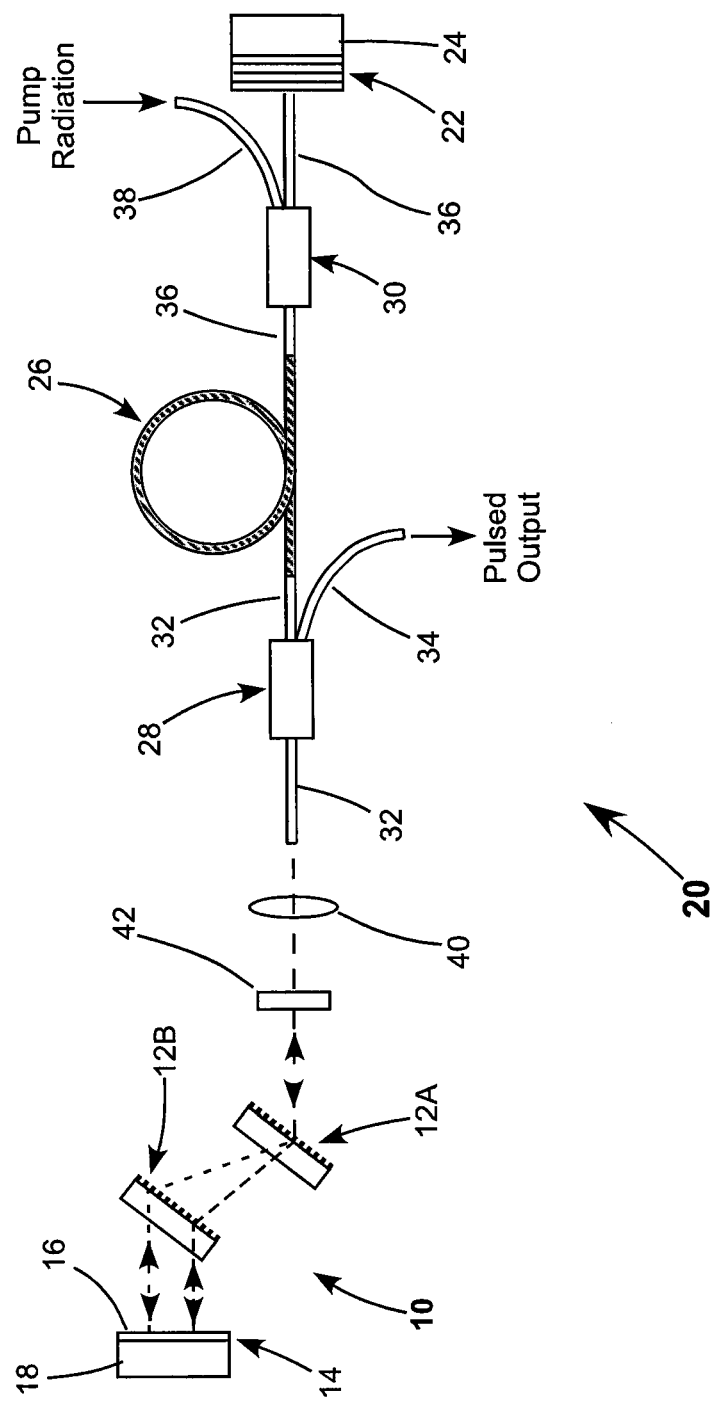
FIG. 3 schematically illustrates a prior art mode-locked fiber laser including a grating-pair pulse-compressor similar to the pulse-compressor of FIG. 1 and functioning as a dispersion compensation device, the fiber laser having a resonant cavity formed between the mirror of the pulse compressor and a saturable Bragg reflector functioning as a mode-locking device.
Figure 4:
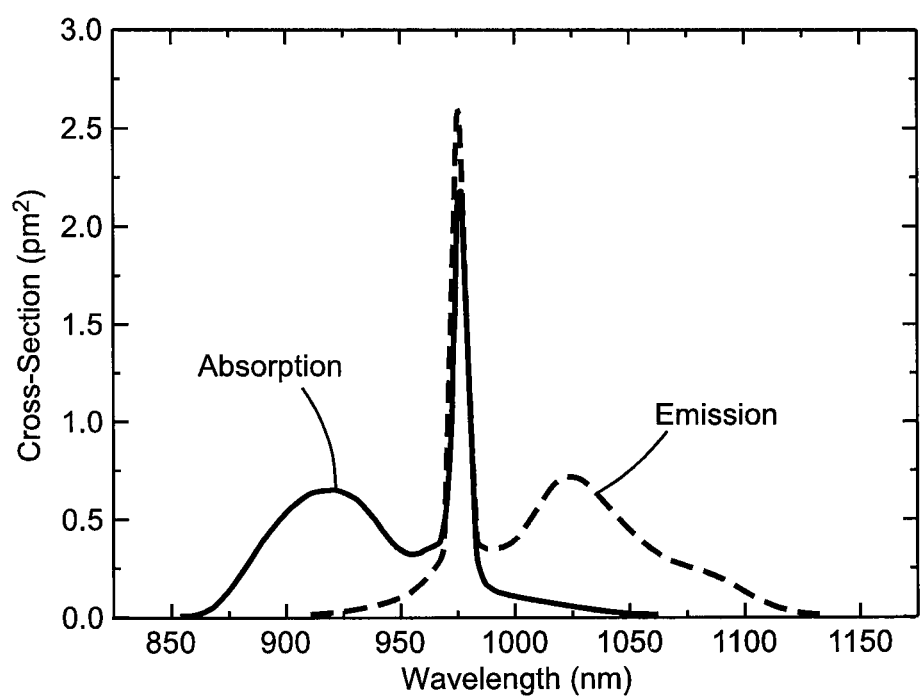
FIG. 4 is a graph schematically illustrating absorption and emission cross-sections as a function of wavelength in a wavelength range from 850 nanometers to 1150 nanometers for a ytterbium-doped gain-fiber.
Figure 7:
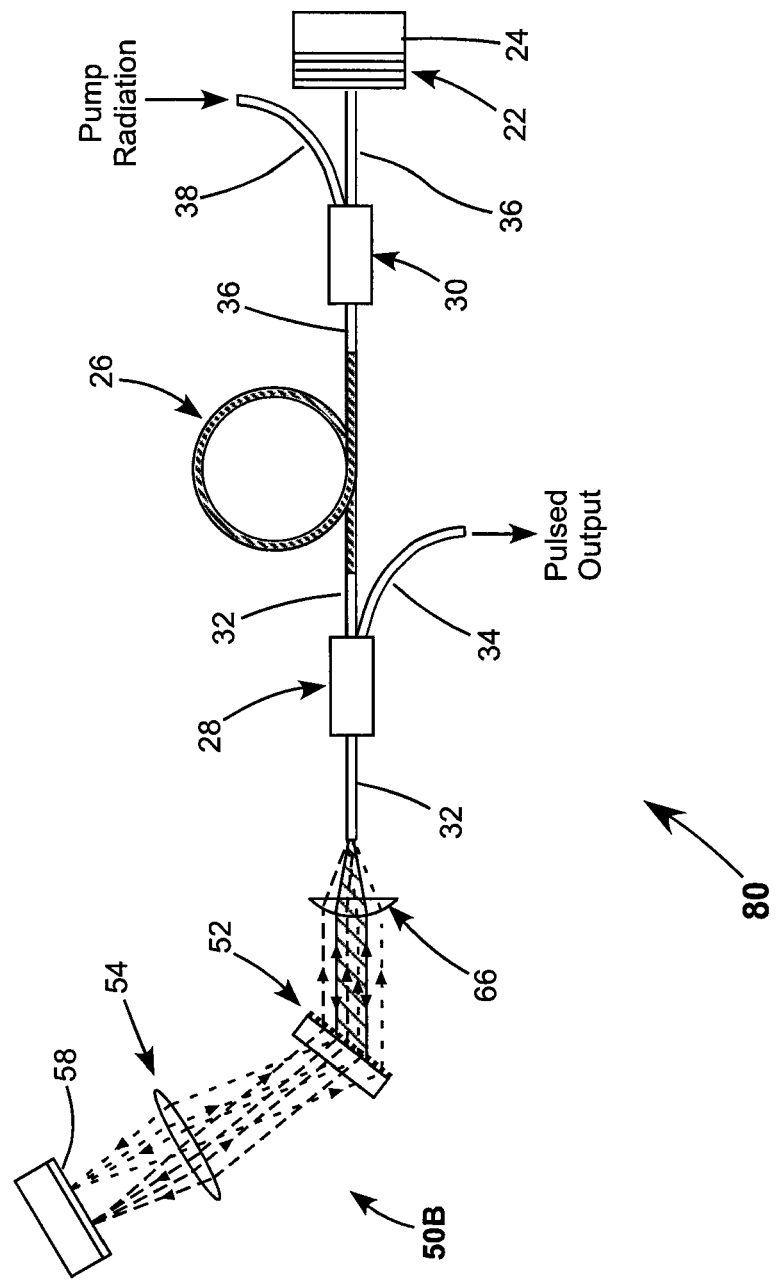
FIG. 7 schematically illustrates a preferred embodiment of a linear-resonator mode-locked fiber laser in accordance with the present invention, similar to the laser of FIG. 3, but wherein the grating pair pulse compressor is replaced by a spectrally-selective intra-cavity dispersion-compensating device in accordance with the present invention in the configuration of FIG. 6.

FIG. 7 schematically illustrates one preferred embodiment 80 of a mode-locked fiber laser in accordance with the present invention. Laser 80 is a standing-wave or linear resonator laser similar to laser 20 of FIG. 3 with an exception that the prior-art, spectrally non-selective grating-pair intra-cavity dispersion compensator of laser 20 is replaced in laser 80 by a spectrally selective intra-cavity dispersion compensator in accordance with the present invention. In laser 80, the configuration of the inventive compensator depicted is configuration 50B described above with reference to FIG. 6A.

Figure 8:
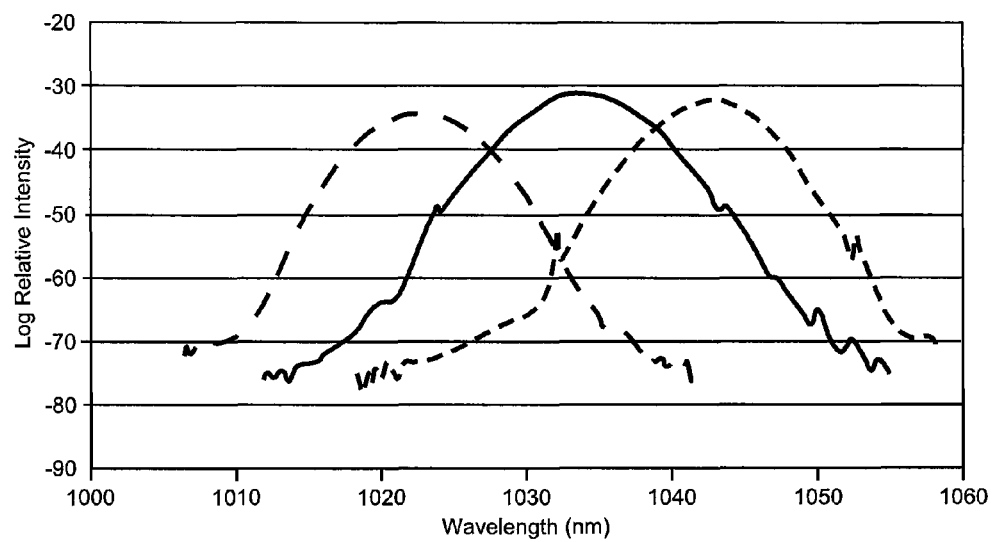
FIG. 8 is a graph schematically illustrating measured optical spectra for pulses of different center wavelengths generated in an example of the apparatus of FIG. 7 by tilting the plane mirror of the spectrally selective dispersion compensating device as depicted in FIG. 6A.

FIG. 8 is a graph schematically illustrating reproductions of measured pulse spectra from an experimental example of the apparatus of FIG. 7. In this example gain-fiber 26 is a 1% Yb-doped fiber. Fiber 32 has a NA of 0.12. Lens 66 has a focal length of 11.0 millimeters (mm). Lens 54 has a focal length of 50.0 mm and is axially spaced from grating 52 by 68.0 mm. This arrangement restricted spectral bandwidth to about twenty nanometers. The grating is a 1250-lines-per-millimeter grating from Ibsen Photonics AS, of Farum, Denmark. The center wavelength was tuned from about 1020 nm (long-dashed curve) to 1045 nm (short-dashed curve) by tilting mirror 28 as illustrated in FIG. 6A. The peak gain is at about 1035 nm at which the solid curve is tuned.

Figure 9:
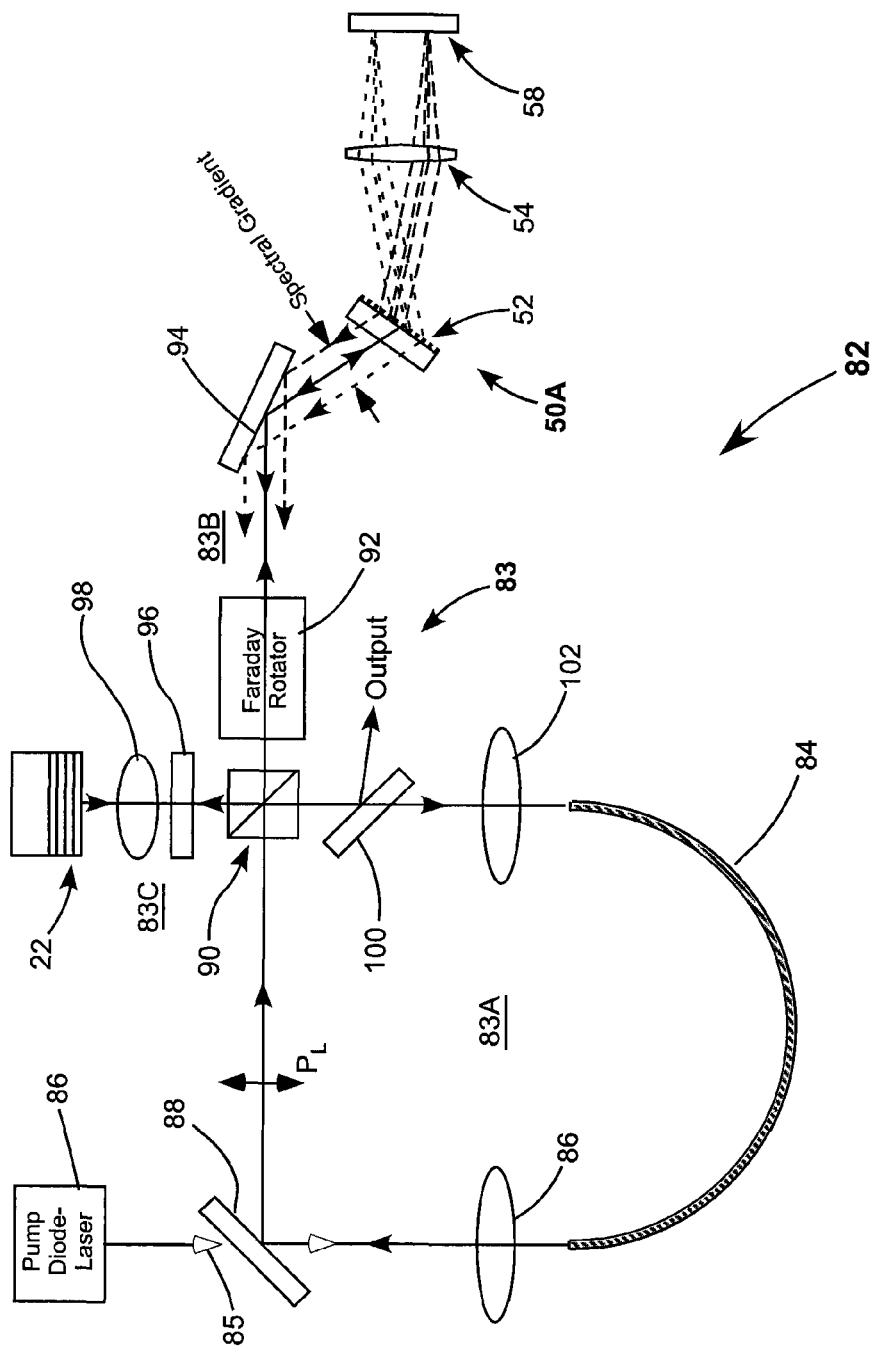
FIG. 9 schematically illustrates a preferred embodiment of a ring-resonator fiber laser in accordance with the present invention including a spectrally-selective intra-cavity dispersion-compensating device in accordance with the present invention in the configuration of FIG. 6, with mode-locking provided by a saturable Bragg reflector.

FIG. 9 schematically illustrates an embodiment 82 of a mode-locked traveling-wave fiber-laser in accordance with the present invention. Laser 82 includes a traveling-wave resonator 83 comprising a loop or unidirectional-propagation portion 83A and straight or bidirectional propagation portions 83B and 83C. The unidirectional propagation portion is formed by a dichroic beamsplitter 85, a Faraday isolator 91 which provides unidirectional propagation, a polarizing beamsplitter cube 90 and a gain-fiber 84. Beamsplitter cube 90 connects the unidirectional propagation portion with the bidirectional propagation portions and the bidirectional propagation portions with each other.

The gain-fiber is optically pumped by radiation from a diode-laser source 87. Dichroic mirror 88 is highly transmissive for the pump-radiation wavelength and highly reflective for radiation generated by the fiber-laser. A lens 86 collimates laser-radiation from the gain-fiber and focuses the pump-radiation into the gain-fiber. Laser-radiation in the loop portion is plane-polarized in the plane of the drawing as indicated by arrows $P_L$. Polarization in the straight portions varies according to the propagation direction and the polarization properties of optical components through which the radiation passes.

In a round trip in resonator 83 laser-radiation from gain-fiber 86 is reflected by dichroic mirror 85 and is transmitted by polarizing beamsplitter 90 into resonator portion 83B. The polarization plane passes through a Faraday rotator 92 and is reflected by a mirror 94 into a spectrally-selective, intra-cavity dispersion-compensating device 50A. In accordance with the present invention, radiation is reflected back out of device 50A, traverses Faraday rotator 92 again and is reflected by polarizing beamsplitter 90 into straight portion 83C of resonator 83. It should be noted that Faraday rotator 92 could be replaced by a quarter-wave plate to provide a 90° polarization-rotation on double pass.

In portion 83C, radiation passes through a quarter-wave plate 96 which circularizes the polarization of the radiation. This radiation is focused by a lens 98 onto a SBR 22. The radiation is reflected by the SBR; re-collimated by lens 98; plane polarized by a return passage through the quarter-wave plate, with a 90° rotation of the polarization plane; and transmitted by polarizing beamsplitter cube into loop portion 83A of the resonator. In loop portion 83A the radiation traverses a front surface polarizer 100 which reflects a portion, for example about 20%, of the radiation as output radiation (mode-locked pulses). The remaining radiation is focused back into gain-fiber 84 by a lens 102.

It should be noted here radiation leaving device 50A has the spatial chirp (spectral gradient) imposed by the device and retains that spatial chirp until it is focused back into the gain-fiber. Lens 102, accordingly, has the same function as lens 66 in laser 80 of FIG. 7, with the NA of the gain-fiber providing the aperture that selects the wavelength range from the spatial chirp of device 50A.

It is emphasized that although resonator 83 appears on superficial consideration to be a ring resonator having appended branches, the resonator is in fact a single, resonator entity having the above described round-trip sequence. There is no constructive or destructive interference in the straight portions of the resonator, as counter-propagating beams therein have different polarization properties.

In summary, fiber lasers described herein include a resonator having a mode-locking element therein and an inventive wavelength-selective dispersion compensating device including only a single diffraction grating. Because there is only one grating losses in the device are significantly reduced compared with prior-art grating-pair devices which are not spectrally selective. In the description of the lasers, the mode-locking element is a saturable Bragg reflector. However, another type of mode-locking element based on modulating intra-cavity loss or gain, such as an acousto-optic modulator, and electro-optical modulator, or nonlinear polarization-rotation modulator may be used without departing from the sprit and scope of the present invention.

The present invention is described above in terms of a preferred and other embodiments. The invention, however, is not limited to the embodiments described and depicted. Rather, the invention is limited only by the claims appended hereto.

What is claimed is:

1. Laser apparatus, comprising:
   a laser resonator including a fiber gain-medium having a gain-bandwidth, said resonator including a plane end mirror;
   a pump-radiation source arranged to energize the gain-fiber for generating laser-radiation in the laser-resonator;
   a mode-locking element located in the resonator for causing the laser-radiation to be generated as mode-locked pulses, the mode-locked pulses undergoing dispersion while propagating through the gain-fiber; and
   a wavelength-selective dispersion compensating device for compensating the dispersion undergone by the mode-locked pulses, said dispersion compensating device including a single diffraction grating located within the resonator near the plane end mirror and a first lens located between the grating and the plane end mirror, and a second lens located between an end of the gain-fiber and the grating, and with the spacing and angular orientation of the grating, lenses and plane end mirror being fixed during operation and providing dispersion compensation and wavelength selection, said wavelength selection resulting at least in part because less than all the wavelengths present in the laser radiation when the gain-fiber is initially energized are delivered from said wavelength-selective dispersion compensating device back into the gain-fiber.

2. The apparatus of claim 1, wherein the wavelength selective device selects one of a spectral bandwidth of the pulses and the center wavelength of the pulses.

3. The apparatus of claim 1, wherein the laser resonator is a linear laser resonator formed between the plane end minor and a second end mirror.

4. The apparatus of claim 1, wherein the mode-locking element is a saturable Bragg mirror functioning as the second end-minor of the laser-resonator.

5. The apparatus of claim 4, wherein the saturable Bragg mirror is butt coupled to the gain-fiber.

6. Laser apparatus, comprising:
   a linear laser resonator including a fiber gain-medium having a gain-bandwidth, the laser resonator having a longitudinal resonator axis and being terminated at one end thereof by a saturable Bragg reflector and at the other end thereof by a plane mirror, the saturable Bragg reflector functioning as a mode-locking element;
   a pump-radiation source arranged to energize the gain-fiber for generating laser-radiation in the laser-resonator, the laser-radiation to be generated as mode-locked pulses, the mode-locked pulses undergoing dispersion while propagating through the gain-fiber;

a first lens, a diffraction grating and a second lens located in the laser resonator between gain-fiber and the plane minor, the diffraction grating being located between the first and second lenses; and wherein the spacing and angular orientation of the first and second lenses, the diffraction grating, and the plane minor are fixed during operation and selected to provide dispersion which compensates the dispersion undergone by the pulses propagating through the fiber, and to select a center wavelength of the mode-locked pulses within the gain-bandwidth of the gain-fiber with the center wavelength selection resulting at least in part because less than all the wavelengths present in the laser radiation when the gain-fiber is initially energized are delivered back into the gain-fiber after passing through the lenses and the grating.

7. The apparatus of claim 6, wherein the first lens is axially spaced from the fiber by about a focal length of the first lens, the second lens is axially spaced from the plane mirror by about a focal length of the second lens, and the second lens is axially spaced from the grating by a distance different from the focal length of the second lens.

8. The apparatus of claim 7, wherein the distance between the grating and the second lens is selectively variable for varying one or more of the compensating dispersion, the center wavelength of the mode-locked pulses within the gain-bandwidth of the gain-fiber, and the spectral bandwidth of the mode-locked pulses.

9. The apparatus of claim 7, wherein the plane minor is selectively tiltable about an axis perpendicular to the longitudinal resonator axis for selecting a center wavelength of the mode-locked pulses within the gain-bandwidth of the gain-fiber.

10. A pulsed fiber laser comprising:
a resonator terminated by first and second end mirrors;
a gain fiber located within the resonator;
a pump source for exciting the gain fiber;
a saturable absorber in the resonator arranged to mode-lock the laser to produce laser pulses;
a single transparent grating located in the resonator between an end of the gain fiber and the first end mirror; and
a first lens located between the grating and the end mirror, and a second lens located between said end of the gain fiber and the grating and with the spacing and angular orientation of the grating, lenses and first end minor being fixed during operation and arranged to compensate for dispersion induced in the laser pulses from the fiber and for wavelength selection, said wavelength selection resulting at least in part because less than all the wavelengths present in the laser radiation when the gain-fiber is initially excited are delivered back into the gain-fiber after passing through the lenses and the grating.

11. A laser as recited in claim 10, wherein a normal to the surface of the first end minor is tilted with respect to the optical axis of the first lens.

12. A laser as recited in claim 11, further including an aperture plate located between the first lens and the first end mirror for narrowing the spectral bandwidth of the laser.

* * * * *